US006651802B2

United States Patent
Hurst

(10) Patent No.: US 6,651,802 B2
(45) Date of Patent: Nov. 25, 2003

(54) BOTTLE ORIENTING METHOD AND APPARATUS

(76) Inventor: Richard Francis Hurst, 1375 Admirals Walk, Vero Beach, FL (US) 32963

( * ) Notice: Subject to any disclaimer, the term of this patent is extended or adjusted under 35 U.S.C. 154(b) by 0 days.

(21) Appl. No.: 10/054,395

(22) Filed: Jan. 24, 2002

(65) Prior Publication Data

US 2003/0136640 A1 Jul. 24, 2003

(51) Int. Cl.[7] .............................................. B65G 47/12
(52) U.S. Cl. ...................... 198/443; 198/529; 198/778; 198/450; 193/12
(58) Field of Search ................................. 198/417, 443, 198/441, 450, 529, 540, 778; 53/443, 446, 448; 193/12

(56) References Cited

U.S. PATENT DOCUMENTS

| | | | | |
|---|---|---|---|---|
| 2,775,335 A | * | 12/1956 | Simpson | 198/439 |
| 3,068,990 A | * | 12/1962 | Drennan | 156/DIG. 25 |
| 3,948,386 A | * | 4/1976 | Nalbach | 198/384 |
| 3,983,616 A | * | 10/1976 | Duke | 29/240 |
| 4,165,809 A | * | 8/1979 | Klein et al. | 198/431 |
| 4,496,039 A | * | 1/1985 | Krooss | 193/44 |
| 4,601,384 A | * | 7/1986 | van Doren | 198/481.1 |
| 4,768,639 A | * | 9/1988 | Gamberini et al. | 198/392 |
| 5,065,852 A | * | 11/1991 | Marti | 198/392 |
| 5,147,023 A | * | 9/1992 | Meindl | 198/437 |
| 5,170,879 A | * | 12/1992 | Smith | 198/452 |
| 5,421,447 A | * | 6/1995 | Ruth et al. | 198/377.1 |
| 5,651,846 A | * | 7/1997 | Hurst | 15/59 |
| 5,695,041 A | * | 12/1997 | Kouda et al. | 198/459.2 |
| 6,089,001 A | * | 7/2000 | Hurst | 53/390 |

* cited by examiner

Primary Examiner—Christopher P. Ellis
Assistant Examiner—Richard Ridley
(74) Attorney, Agent, or Firm—Richard M. Saccocic

(57) ABSTRACT

A method and apparatus are provided to manually discharge bottles from a tray of bottles onto a sloped surface at the bottom of which gravity fed individual bottles are captured at the top receiving edge of a parallel sloped multi-pocketed rotatable indexing wheel and sequentially: (a.) discharged tangentially at the bottom edge of said indexing wheel in a single row, (b.) corrected to a vertical axis, and (c.) exited onto adjoining equipment for further operations.

7 Claims, 1 Drawing Sheet

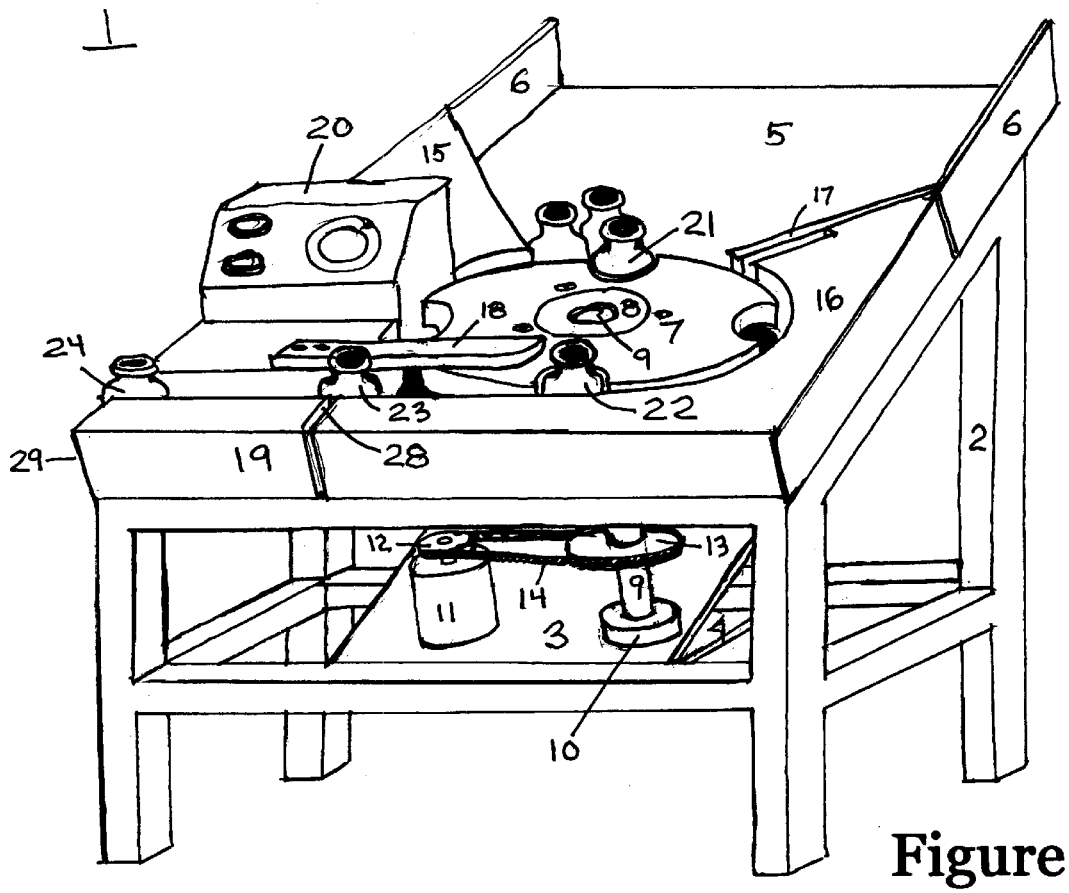
Figure #1.
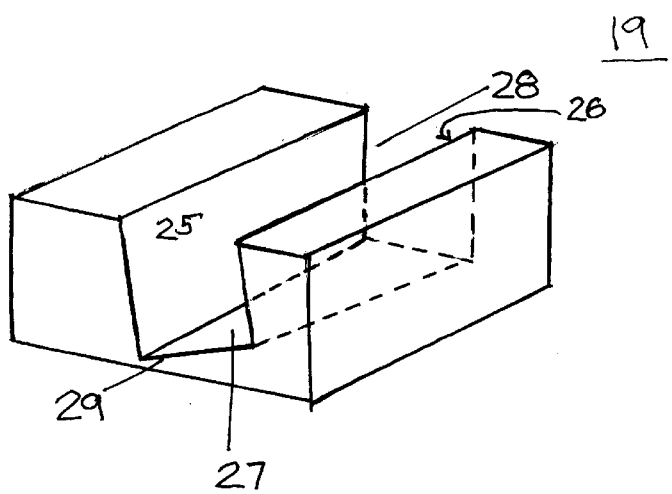
Figure #2.

BOTTLE ORIENTING METHOD AND APPARATUS

BACKGROUND OF THE INVENTION

1. Field of the Invention

The present invention relates to trayed bottle unloading machines of the type adapted to reorient bottles from mass collection within storage trays into a single row of bottles for further individual bottle processing primarily in the pharmaceutical industry.

More particularly, the present invention relates to a novel sloped bottle surface where bottles are gravity fed downward into the top receiving edge of a parallel sloped large diameter multi-pocketed rotatable index wheel, and sequentially: a, tangentially discharged from bottom exit edge of said index wheel in a single file row, b, corrected to a vertical axis in a novel passive helix track, and, c, exited from the apparatus.

The present invention feeds bottles on a first-in/first-out basis eliminating stagnantly positioned bottles, which is of particular importance in the pharmaceutical industry.

The present invention has essentially one moving part (index wheel), is economical, requires minimal floor space, and is inherently safe for high-speed glass bottle handling.

2. Description of the Prior Art

The novel invention of the present method and apparatus [apparatus] includes four intrinsic and cooperatively functional elements: a, a sloped gravity influenced bottle feed slide having a top loading end and a bottom open end, b, a multi-pocketed large diameter index wheel, in a plane parallel with said slide, having a tilted bottle capturing top edge operationally abutting the bottom open end of the bottle feed slide and a bottle discharge bottom edge, c, a tangential exit track in a plane parallel with said index wheel to align bottles in a single file row, with an end to receive bottles from said index wheel bottom edge, and a discharge second end, d, a passive helix track having a tilted first end guide, and a vertical axis bottle discharge second end.

Prior art includes gravity influenced bottle feeding slides including Krooss U.S. Pat. No. 4,496,039 entitled "Bottle Alignment Apparatus," and Meindl U.S. Pat. No. 5,147,023 entitled "Method and Apparatus for Converting a Multi-Row Container into a Single Row Stream."

Neither of these patents, however, contains all of the elements of and arranged in accordance with the present novel invention. Index wheels and tangential guides have customarily been used to convey bottles including Kouda U.S. Pat. No. 5,695,041 entitled "Method to Separate Articles . . . , " Omega Design Corporation, U.S. Pat. No. 5,421,447 entitled "High Rate Transfer Wheel for Orienting Unscrambled Container," and Hurst U.S. Pat. No. 6,089,001 entitled "Inclined Tray Bottle Traying Machine," however, these patents do not include all of the elements intrinsic to the present novel invention.

Although many bottle tilting guides and tilting ramps are available, the helix track of the present invention is a novel apparatus element consisting of a solid rectangular block of a low friction plastic with a helix track therein to receive tilted bottles on a first end, and exit vertical axis corrected bottles at a second discharge end.

SUMMARY OF THE INVENTION

It is a principle object of the present invention to collect tilted bottles from a supply of tilted bottles at the lower end of a sloped surface into a bottle indexing wheel and sequentially reorient said tilted bottles into a single-file row of bottles corrected to a vertical axis.

It is a principle object of the present invention to gravitationally insert tilted bottles from a supply of bottles at the lower end of a sloped surface into a tilted multi-pocketed index wheel, and sequentially: a, transport individually pocketed bottles to an index wheel exit position, b, exit bottles from said index wheel, c, align bottles in a single-file row of tilted bottles, and, d, correct bottles to a vertical axis by means of a passive helix track.

It is a principle object of the present invention to provide a large diameter multi-pocketed bottle index wheel to provide high production rates at minimal index wheel revolution speeds to protect bottles from excess shock and minimize noise.

It is a principle object of the present invention to provide a [slippery] bottle slope from low coefficient-of-friction plastic such as TEFLON™ to maximize the effect of gravitational forces on bottles and minimize noise.

It is a principle object of the present invention to provide an index wheel, tangential exit guide, and helix track manufactured from low co-efficient-of-friction plastic such as ultra high molecular weigh polyethylene to minimize friction and minimize noise.

It is a principle object of the present invention to provide a bottle orienting machine free of metal bottle contact parts to eliminate generation of metallic particles in operation.

It is a principle object of the present invention to provide a slope angle equal and opposite to the slope of the helix track exit end.

It is a principle object of the present invention to provide an agitating force to bottles at the lower end of the slippery slope as imparted by the rotary motion of the abutting multi-pocketed index wheel.

According to these and other objects of the present invention, there is provided a method and apparatus for orienting bottles from a supply of bottles in a storage tray into a single file row of bottles.

The method comprises manually depositing bottles onto a slippery sloped surface to be gravitationally fed and inserted into individual pockets at the upper edge of an abutting multi-pocketed tilted bottle index wheel, and sequentially exiting said tilted bottles at the lower edge of said index wheel, automatically collecting said bottles in a tilted single-file row of bottles and automatically reorienting the tilted axis of said bottles to a vertical axis within a helix track.

BRIEF DESCRIPTION OF THE DRAWINGS

FIG. 1 is an isometric drawing of a preferred embodiment of apparatus for feeding tilted bottles from a supply of bottles on a sloped surface to be gravitationally inserted into the top edge of a multi-pocketed tilted bottle indexing wheel to be sequentially exited at the bottom edge of said indexing wheel, realigned into a single row of bottles, and automatically corrected to a vertical axis; and FIG. 2 is an isometric drawing of a preferred embodiment of apparatus for automatically reorienting bottles from a tilted axis at a bottle input end to a vertical axis at a bottle exit end.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Reference is now made to the drawings, wherein like characteristics and features of the present invention shown in the various figures are designated by the same reference numerals.

FIG. 1 is an isometric drawing in schematic form of a preferred embodiment bottle orienting apparatus for feeding tilted bottles from a supply of bottles on a sloped surface to be gravitationally inserted into the top edge of a multi-pocketed index wheel and to be sequentially rotated and exited at the bottom edge of said index wheel, realigned into a single row of tilted bottles, and corrected to a vertical axis in a helix track.

The bottle orienting apparatus 1 includes slippery slope deck 5 and a horizontal lower deck 4 supported by a machine frame 2. An electric drive motor 11 and an index wheel shaft bearing 10 are supported by a sloped motor and index shaft bearing bracket 3 attached to the horizontal lower deck 4.

A motor drive sprocket 12 is operably connected to index wheel driven sprocket 13, mounted [of Index Wheel Shaft] on index wheel shaft 9, by a drive belt 14. Bottle guides 6, attached to the rear sides of sloped deck 5, retain bottles on said sloped deck 5. Left guide 5 and right guide 16, attached to sloped deck 5, guide gravity conveyed bottles into the pocketed index wheel 7, which is mounted on index wheel hub 8 that is attached to index wheel shaft 9. Index wheel 7 includes a plurality of pockets arranged around the periphery of the wheel 7. Index wheel 7 is arranged co-planar with sloped surface as provided for by the slope of bracket 3 which is also co-planar with sloped surface 5. As seen in FIG. 1, index wheel 7 picks up a bottle at its top edge, rotates clockwise and delivers the bottle to the inlet of an exit guide 18, at the wheel's lower edge.

A flexible tongue 17, mounted to right guide 16, actuates an emergency stop switch under right guide 16 (not shown) when flexed by a fallen bottle failing to fully enter pocketed index wheel 7.

A bottle exit guide 18, attached tohelix track 19 and arranged parallel with the lower portion of right guide 16, removes bottles tangentially from the lower edge of pocketed index wheel 7 and aligns bottles in a tilted single-file row. A helix track 19, attached to sloped deck 5, receives tilted bottles from the bottle exit guide 18 and reorients said tilted bottles to a vertical axis.

An electric control box 20 houses commercially available standard controls for starting and stopping an electric drive motor 11.

In operation of the invention, bottles as placed onto sloped deck 5 are gravitationally fed downwards where an entry bottle 21 is gravitationally inserted into a pocket at the upper edge of index wheel 7. The rotation of the index wheel 7 by means of the motor 11 operably connected to index wheel shaft 9, imparts an agitating force on the bottles at the lower exit end of [Slippery Slope Deck] sloped deck 5, thereby aiding the gravitational effect.

An exiting bottle 22 is channelized by bottle exit guide 18 as it exits from the rotating index wheel 7 and, thusly, the bottles align in a single-file row of tilted bottles between bottle exit guide 18 and the lower portion of [Right Guide] right guide 16.

Continuous rotation of index wheel 7 causes the lead aligned tilted bottle to enter helix track 19.

FIG. 2 shows an isometric drawing in schematic form of a preferred helix track 19.

An exiting entry bottle 23 enters the helix track guide 19 at its entry end 28 and travels along the helix track bottom surface 27 between walls 25 and 26 to the position illustrated as exit bottle 24 at the exit end 29 of track guide 19. The slope of the bottom surface 27 at end 28 is equal but opposite to the slope of sloped deck 5. Thus, the slope of the bottom surface 27 at the end 29 of helix track 19 is horizontal, thereby exit bottle 24 is reoriented to a vertical axis.

From the aforementioned description it is understood that tilted bottles as received from sloped deck 5 are gravitationally inserted into the pocket at the bottle receiving edge of index wheel 7. Rotation of the index wheel 7 causes tilted bottles to sequentially: a, exit from index wheel 7, b, assemble in a single-file row tilted row of bottles within the tilted bottle track formed by exit guide 18 and the parallel wall of right guide 16, and, c, pass through helix track 19 where all said tilted bottles are corrected to a vertical axis and exit from the apparatus.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. Bottle orienting apparatus comprising:
   a sloped surface along which bottles are supplied and gravitationally conveyed in a tilted position substantially perpendicular to said sloped surface;
   an index wheel having a plurality of pockets around the periphery of thereof, said index wheel being mounted for rotational movement on said sloped surface, said pockets of said wheel receiving said bottles at a top edge thereof from the sloped surface, said index wheel delivering said bottles to a bottom edge thereof; and
   a helix track receiving said bottles from the bottom edge of the wheel, said helix track having a helix surface, said helix surface reorienting said bottles from said titled position to a vertical position and in a line substantially tangential to said bottom edge of the wheel.

2. The apparatus of claim 1, further comprising an electric motor for rotating said index wheel.

3. The apparatus of claim 2, further comprising a frame for supporting said apparatus.

4. The apparatus of claim 1, further comprising guides along side edges of said sloped surface, said guides maintaining the bottles on the sloped surface and feeding the bottles to the pockets of the index wheel.

5. The apparatus of claim 1, further comprising agitating means for assisting movement of the bottles along the sloped surface and into the pockets of the index wheel.

6. The apparatus of claim 1, wherein said helix track comprises a block of low coefficient of plastic will a helix track formed therein, said helix track receiving tilted bottles from a row of tilted bottles at an entrance end as supplied by a tilted bottle index wheel, said helix track exiting bottles reoriented to a vertical axis at a bottle exit end.

7. A bottling method comprising:

gravitationally conveying bottles in a tilted position along a sloped conveyor;

receiving said tilted bottles at a receiving edge of a multi-pocketed and tilted bottle indexing wheel;

rotating said indexing wheel to convey said tilted bottles to a bottom exit edge of said indexing wheel;

exiting said tilted bottles from said indexing wheel;

tangentially aligning said tilted bottles in a single-file row; and reorienting said tilted bottles into a vertical position within a helix track.

* * * * *